(12) United States Patent
King et al.

(10) Patent No.: US 9,732,193 B1
(45) Date of Patent: Aug. 15, 2017

(54) FLAME-RETARDANT POLYHYDROXYALKANOATE PHOSPHONATE MATERIALS

(71) Applicant: International Business Machines Corporation, Armonk, NY (US)

(72) Inventors: Scott B. King, Rochester, MN (US); Brandon M. Kobilka, Tucson, AZ (US); Joseph Kuczynski, North Port, FL (US); Jason T. Wertz, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/078,779

(22) Filed: Mar. 23, 2016

(51) Int. Cl.
| | | |
|---|---|---|
| *C08G 79/04* | (2006.01) | |
| *C08L 55/02* | (2006.01) | |
| *C08L 67/00* | (2006.01) | |
| *C08L 67/04* | (2006.01) | |
| *C08L 69/00* | (2006.01) | |
| *C08L 71/00* | (2006.01) | |
| *C08L 75/04* | (2006.01) | |
| *C12P 7/62* | (2006.01) | |
| *C08L 85/02* | (2006.01) | |
| *C08G 63/692* | (2006.01) | |

(52) U.S. Cl.
CPC ............. *C08G 79/04* (2013.01); *C08L 55/02* (2013.01); *C08L 67/00* (2013.01); *C08L 67/04* (2013.01); *C08L 69/00* (2013.01); *C08L 71/00* (2013.01); *C08L 75/04* (2013.01); *C08L 85/02* (2013.01)

(58) Field of Classification Search
CPC .. C08G 63/692; C08G 79/04; C08G 2230/00; C08L 67/00; C12P 7/62
USPC .......................................... 525/190, 450, 451
See application file for complete search history.

(56) References Cited

U.S. PATENT DOCUMENTS

| | | | |
|---|---|---|---|
| 4,288,489 A | 9/1981 | Nachbur et al. | |
| 5,126,387 A | 6/1992 | Hand | |
| 8,278,375 B2 | 10/2012 | Schanen et al. | |
| 8,852,468 B2 | 10/2014 | Brizius | |
| 9,127,156 B2 | 9/2015 | Liao et al. | |
| 2011/0251349 A1* | 10/2011 | Padwa ................. | C08G 63/912 525/190 |
| 2014/0000751 A1* | 1/2014 | Kagumba ............ | C08G 63/916 139/420 R |
| 2015/0148519 A1 | 5/2015 | Boday et al. | |
| 2015/0225510 A1 | 8/2015 | Boday et al. | |
| 2015/0225511 A1 | 8/2015 | Boday et al. | |

OTHER PUBLICATIONS

Gomez, et al., "Making Green Polymers Even Greener: Towards Sustainable Production of Polyhydroxyalkanoates from Agroindustrial By-Products", Intech, Advances in Applied Biotechnology, Jan. 2012, 23 pp.
Biotechnology Forums, Bioplastics: Microbial Production of Polyhydroxyalkanoates (PHA's), viewed Feb. 10, 2016 http://www.biotechnologyforums.com/thread-2280.html, 6 pp.
Eroglu, et al., "Hydroxylation of Pendant Vinyl Groups of Poly(3-hydroxy Undec-10-enoate) in High Yield", Journal of Applied Polymer Science, vol. 97, 2005, 8 pp.

* cited by examiner

*Primary Examiner* — Fred M Teskin
(74) *Attorney, Agent, or Firm* — Patterson + Sheridan, LLP

(57) ABSTRACT

In an example, a flame-retardant polyhydroxyalkanoate (PHA) phosphonate material has a polymeric backbone that includes a phosphonate linkage between a first PHA material and a second PHA material.

14 Claims, 2 Drawing Sheets

FLAME-RETARDANT POLYHYDROXYALKANOATE PHOSPHONATE MATERIALS

I. FIELD OF THE DISCLOSURE

The present disclosure relates generally to flame-retardant polyhydroxyalkanoate (PHA) phosphonate materials.

II. BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

III. SUMMARY OF THE DISCLOSURE

According to an embodiment, a process includes forming a PHA material having a terminal carboxylic acid group from a biorenewable aliphatic fatty acid via a bacterial fermentation process. The process also includes chemically reacting the PHA material with a diol to convert the terminal carboxylic acid group to a terminal hydroxyl group. The process further includes chemically reacting the terminal hydroxyl group with a phosphorus-based material to form a flame-retardant PHA phosphonate material.

According to another embodiment, a flame-retardant PHA phosphonate material is disclosed. The flame-retardant PHA phosphonate material is formed by a process that includes forming a PHA material having a terminal carboxylic acid group from a biorenewable aliphatic fatty acid via a bacterial fermentation process. The process also includes chemically reacting the PHA material with a diol to convert the terminal carboxylic acid group to a terminal hydroxyl group. The process further includes chemically reacting the terminal hydroxyl group with a phosphorus-based material to form a flame-retardant PHA phosphonate material.

According to another embodiment, a flame-retardant PHA phosphonate material is disclosed. The flame-retardant PHA phosphonate material has a polymeric backbone that includes a phosphonate linkage between a first PHA material and a second PHA material.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

Figure 1:
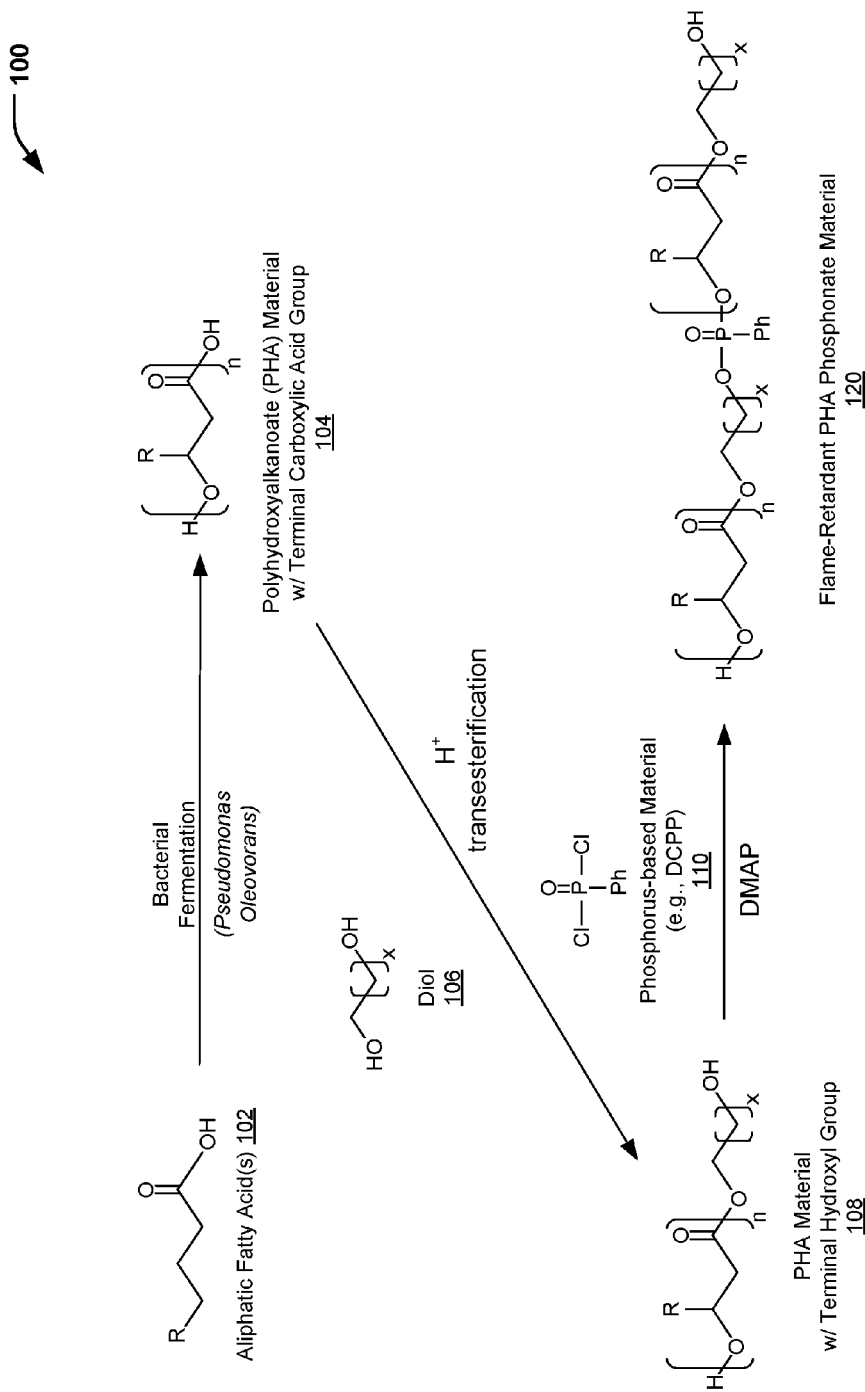
Figure 2:
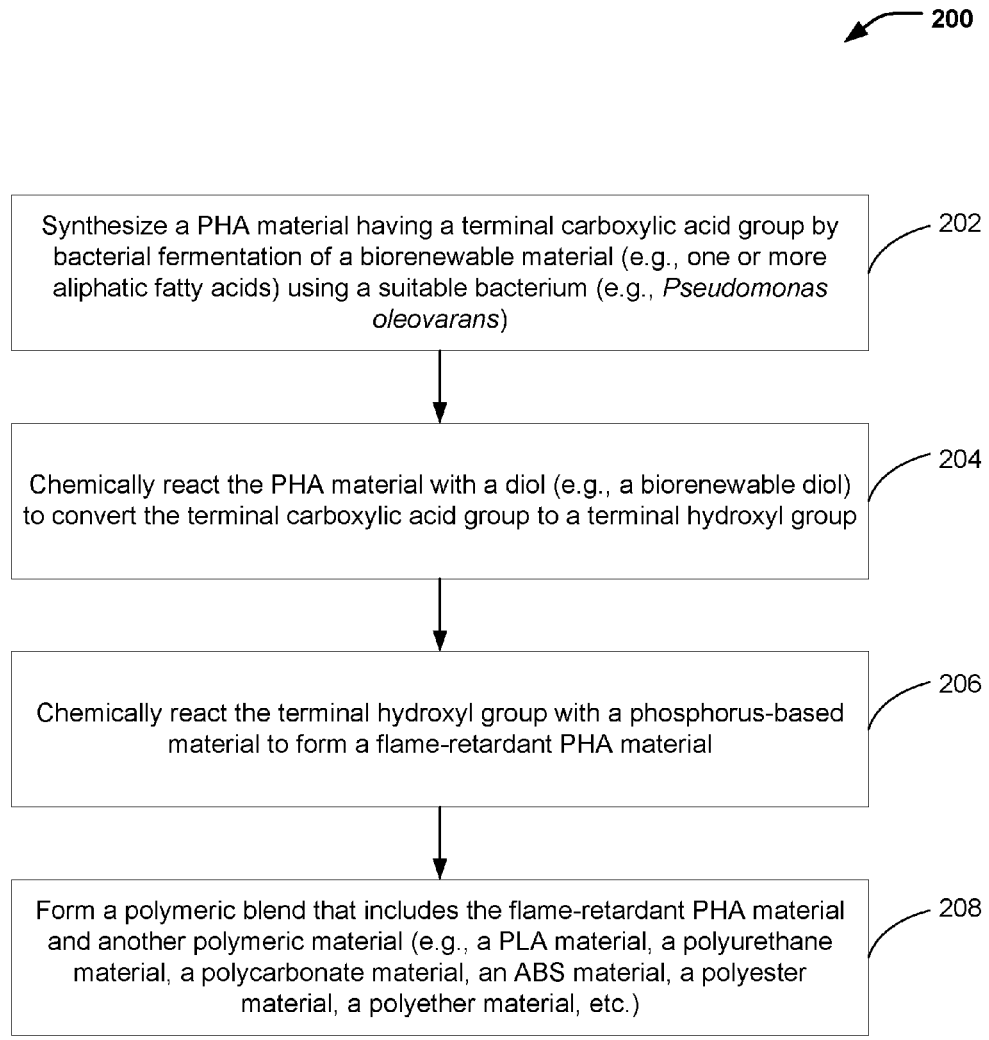

FIG. 1 is a chemical reaction diagram illustrating a process of forming a flame-retardant PHA phosphonate material, according to one embodiment; and FIG. 2 is a flow diagram showing a particular embodiment of a process of forming a flame-retardant PHA phosphonate material.

V. DETAILED DESCRIPTION

The present disclosure relates to flame-retardant (FR) polyhydroxyalkanoate (PHA) phosphonate materials and processes for forming FR PHA phosphonate materials. As used herein, the term "PHA material" is used to refer to a poly(3-hydroxyalkanoate) material, which is a group of storage polymers produced by many types of bacteria in response to growth restriction by a nutrient other than the carbon source. To illustrate, *Pseudomonas oleovorans* is an example of a microorganism that produces PHAs with relatively long pendant side chains.

Referring to FIG. 1, a chemical reaction diagram 100 illustrates a particular embodiment of a process of forming a flame-retardant PHA phosphonate material 120. The first chemical reaction in FIG. 1 illustrates that a PHA material 104 having a terminal carboxylic acid group may be formed from a biorenewable aliphatic fatty acid 102 (or a mixture of biorenewable aliphatic fatty acids) via a bacterial fermentation process. The second chemical reaction in FIG. 1 illustrates that the PHA material 104 (having the terminal carboxylic acid group) may be chemically reacted with a diol 106 (or multiple diols) to convert the terminal carboxylic acid group to a terminal hydroxyl group, resulting in the formation of a PHA material 108 with a terminal hydroxyl group. The third chemical reaction in FIG. 1 illustrates that the PHA material 108 (with the terminal hydroxyl group) may be chemically reacted with a phosphorus-containing material 110 to form the flame-retardant PHA phosphonate material 120. By incorporating phosphorus into a polymeric backbone via a phosphonate linkage, a PHA material may be rendered "inherently" flame-retardant, thereby reducing or eliminating the need for flame retardant additives.

In the first chemical reaction of FIG. 1, the aliphatic fatty acid 102 includes the letter R in order to indicate that an alkyl chain length may vary, depending on the particular aliphatic fatty acid (or mixture of fatty acids) that are utilized. Illustrative, non-limiting examples of aliphatic fatty acids may include hexanoic acid, heptanoic acid, octanoic acid, nonanoic acid, decanoic acid, or undecanoic acid (among other alternatives). Thus, while the first chemical reaction of FIG. 1 illustrates an example of a single aliphatic fatty acid, alternative and/or additional aliphatic fatty acids or mixtures of aliphatic fatty acids may be used. In a particular embodiment, the biorenewable aliphatic fatty acid 102 may be formed from a biorenewable plant oil (or multiple plant oils), such as castor oil, linseed oil, soybean oil, or combinations thereof (among other alternatives).

A bacterial fermentation process may be used to form the PHA material 104 from the biorenewable aliphatic fatty acid 102. For illustrative purposes, the PHA material 104 depicted on the right side of the first chemical reaction diagram is identified as "PHA material 104 w/terminal carboxylic acid group" in order to show the subsequent conversion of the terminal carboxylic group to a terminal hydroxyl group. In FIG. 1, the integer n is used to illustrate the variable molecular weight of the PHA material 104 formed from the aliphatic fatty acid 102. In some cases, the length of the PHA material 104 (and associated molecular weight) may be adjusted by modifying reaction conditions, such as time, temperature, and the bacterium that is selected for fermentation. In the example of FIG. 1, *pseudomonas oleovorans* is illustrated as a bacterium that may be used for the bacterial fermentation process. Other suitable bacteria may be utilized in other cases. To illustrate, *pseudomonas oleovorans* may be grown in the presence of the aliphatic fatty acid(s) 102, and the resulting polymer may be extracted from lyophilized cells using chloroform and precipitated with methanol.

The second chemical reaction in FIG. 1 illustrates that the PHA material 104 (having the terminal carboxylic acid group) may be chemically reacted with a diol 106 (or multiple diols) to convert the terminal carboxylic acid group to a terminal hydroxyl group, forming a PHA material 108 with a terminal hydroxyl group. In FIG. 1, the integer x is used to illustrate that the diol 106 may have a variable chain length and to show the location where the diol 106 bonds to the PHA material 108. In some cases, the diol 106 may include a biorenewable diol, which may further increase a biorenewable content of the resulting PHA phosphonate material 120. Illustrative, non-limiting examples of biorenewable diols include ethylene glycol, propylene glycol (or derivatives thereof), butylene glycol, and pentylene glycol.

Prophetic Example: Transesterification

Transesterification of PHA with a glycol may be carried out by heating a solution of PHA in glycol at an elevated temperature in the presence of a catalyst. This catalyst may be acidic in nature, or the catalyst may promote condensation reaction (e.g., dibutyltin dilaurate) and may be used in amounts ranging from 0.1 to 10.0 mol percent. The temperature may be above 100° C. and may be at the reflux temperature of the glycol. The reaction time may be in excess of 1 hour. The reaction may be finished by pouring the reaction mixture into a solvent such as water, methanol, ethanol, acetone, etc. and may cause precipitation of the polymer, which then may be filtered. The polymer may be then be purified further by dissolving in chloroform, or THF and may be precipitated into hexane. The polymer may be filtered, and dried. Further purification may be carried out by those skilled in the arts.

The third chemical reaction in FIG. 1 illustrates that the terminal hydroxyl group of the PHA material 108 (having the terminal hydroxyl group) may be chemically reacted with a phosphorus-based material 110 to form the flame-retardant PHA phosphonate material 120. In a particular embodiment, the terminal hydroxyl group may be reacted with the phosphorus-based material 110 in solution or under melt conditions using an appropriate catalyst, such as dimethylaminopyridine (DMAP). In the particular embodiment illustrated in FIG. 1, the phosphorus-based material 110 is a phosphine oxide, such as dichlorophenylphosphine oxide (identified as "DCPP" in FIG. 1). In some cases, alternative and/or additional phosphorus-based materials may be utilized.

The right side of the third chemical reaction diagram of FIG. 1 illustrates that a hydroxyl group of a first hydroxyl-terminated PHA material chemically reacts with a first chloride group of the phosphorus-based material 110, and a hydroxyl group of a second hydroxyl-terminated PHA material chemically reacts with a second chloride group of the phosphorus-based material 110. The chemical reaction of the two hydroxyl groups with the two chloride groups results in the formation of the flame-retardant PHA material 120 having a first PHA material that is bonded to a second PHA material via the phosphorus-based material 110.

Prophetic Example: Formation of Flame-Retardant PHA Phosphonate Material

Hydroxyl-functionalized PHA and a catalytic (approx. 5%) amount of 4-(dimethylaminopyridine) (DMAP) may be added to a dried reaction vessel under inert atmosphere. The two compounds may be dissolved in an organic solvent such as chloroform, THF, toluene, chlorobenzene etc., and the reaction may be carried out at or above room temperature, under reflux conditions. DCPP may be added dropwise to the reaction mixture while stirring. The reaction generates HCl gas which may be scavenged by venting to a vessel containing a basic, aqueous solution. The reaction may also be exposed to a reduced pressure to further drive off HCl gas and promote the reaction of DCPP with the hydroxyl groups. Upon completion, the reaction may be cooled to room temperature, and the crude product may be dissolved in an organic solvent such as chloroform, THF, toluene, chlorobenzene etc., if no solvent was used to conduct the reaction. The polymer may be precipitated by pouring the solution into an organic non-polar solvent such as hexane, methanol, ethanol, acetone, etc. Any resulting solids may be filtered and purified further by techniques known to those skilled in the arts, such as Soxhlet extraction.

In some cases, the mechanical properties of the flame-retardant PHA phosphonate material 120 may be "tuned" by varying the length of the PHA material 104, which can be achieved by modifying reaction conditions, such as time, temperature, and the bacterium that is selected for fermentation.

In a particular embodiment, the flame-retardant PHA phosphonate material 120 of FIG. 1 may be mixed with a second polymeric material (or multiple polymeric materials) to form a polymeric blend. In some cases, the second polymeric material may include a polylactic acid (PLA) material, a polyurethane material, a polycarbonate material, an acrylonitrile butadiene styrene (ABS) material, a polyester material, a polyether material, or a combination thereof.

Thus, FIG. 1 illustrates an example of a process of forming a flame-retardant PHA phosphonate material. A bacterial fermentation process may be used to form a PHA material with a terminal carboxyl acid group from a biorenewable aliphatic fatty acid. A diol may be used to convert the terminal carboxylic acid group to a terminal hydroxyl group. The terminal hydroxyl groups of two PHA materials may chemically react with a phosphorus-based material to form a PHA phosphonate material having a polymeric backbone that includes a phosphonate linkage between the two PHA materials. The phosphonate linkage in the polymeric backbone may render the PHA material "inherently" flame-retardant, thereby reducing or eliminating the need for flame retardant additives.

Referring to FIG. 2, a flow diagram illustrates a process 200 of forming a flame-retardant PHA phosphonate material, according to a particular embodiment. In the particular embodiment illustrated in FIG. 2, the process 200 includes utilizing the flame-retardant PHA phosphonate material as a component of a polymeric blend. In other cases, the flame-retardant PHA phosphonate material may be used as a standalone polymeric material.

In the particular embodiment illustrated in FIG. 2, operations associated with an example process of producing a flame-retardant PHA phosphonate material are identified as operations 202-206. It will be appreciated that the operations shown in FIG. 2 are for illustrative purposes only and that the chemical reactions may be performed in alternative orders, at alternative times, by a single entity or by multiple entities, or a combination thereof. As an example, one entity may produce a biorenewable material (e.g., an aliphatic fatty acid), another entity may produce a PHA material from the biorenewable material, while another entity may produce a flame-retardant PHA phosphonate material. Further, alternative or additional entities may perform operations associated with forming a polymeric blend that includes the flame-retardant PHA phosphonate material and another polymeric material (illustrated as operation 208).

The process 200 includes synthesizing a PHA material by bacterial fermentation of a biorenewable material using a suitable bacterium, at 202. For example, referring to the first chemical reaction illustrated in FIG. 1, a bacterial fermentation process (e.g., using *pseudomonas oleovarans* bacteria) of the biorenewable aliphatic fatty acid 102 results in the formation of the PHA material 104 having the terminal carboxylic acid group.

The process 200 includes chemically reacting the PHA material (having the terminal carboxylic acid group) with a diol to convert the terminal carboxylic acid group to a terminal hydroxyl group, at 204. For example, referring to the second chemical reaction illustrated in FIG. 1, the PHA material 104 may be chemically reacted with the diol 106 to form the PHA material 108 with the terminal hydroxyl group.

The process 200 includes chemically reacting the terminal hydroxyl group with a phosphorus-based material to form a flame-retardant PHA phosphonate material, at 206. For example, referring to the third chemical reaction illustrated in FIG. 1, the terminal hydroxyl group of the PHA material 108 may be chemically reacted with the phosphorus-based material 110 to form the PHA phosphonate material 120. As shown in the example of FIG. 1, the flame-retardant PHA phosphonate material 120 has a polymeric backbone that includes a phosphonate linkage between a first PHA material and a second PHA material. In the example of FIG. 1, the first PHA material and the second PHA material shown on the right side of the third chemical reaction diagram have similar structures to the PHA material 108 shown on the left side of the third chemical reaction diagram. In other cases, the first and second PHA materials of the polymeric backbone of the flame-retardant PHA phosphonate material 120 may have different structures. As further described herein, the first PHA material and the second PHA material may be formed from biorenewable materials.

In the particular embodiment illustrated in FIG. 2, the process 200 further includes forming a polymeric blend that includes a first polymeric material and the flame-retardant PHA phosphonate material, at 208. For example, the first polymeric material may include a PLA material, a polyurethane material, a polycarbonate material, an ABS material, a polyester material, a polyether material, or a combination thereof.

Thus, FIG. 2 illustrates an example of a process of forming a flame-retardant PHA phosphonate material. In the example of FIG. 2, the addition of the flame-retardant PHA phosphonate material of the present disclosure may be used to increase a biorenewability content of a polymeric material for use in various applications. In other cases, the flame-retardant PHA phosphonate material of the present disclosure may be used as a standalone polymeric material.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A process comprising:
    forming a polyhydroxyalkanoate (PHA) material having a terminal carboxylic acid group from a biorenewable aliphatic fatty acid via a bacterial fermentation process;
    chemically reacting the PHA material with a diol to convert the terminal carboxylic acid group to a terminal hydroxyl group; and
    chemically reacting the terminal hydroxyl group with a phosphorus-based material to form a flame-retardant PHA phosphonate material.

2. The process of claim 1, wherein the biorenewable aliphatic fatty acid is formed from a biorenewable plant oil.

3. The process of claim 2, wherein the biorenewable plant oil includes castor oil, linseed oil, soybean oil, or a combination thereof.

4. The process of claim 1, wherein the diol includes a biorenewable diol.

5. The process of claim 4, wherein the biorenewable diol includes ethylene glycol, propylene glycol, butylene glycol, pentylene glycol, or a combination thereof.

6. The process of claim 1, wherein the phosphorus-based material includes a phosphine oxide.

7. The process of claim 6, wherein the phosphorus-based material includes dichlorophenylphosphine oxide.

8. The process of claim 1, wherein the terminal hydroxyl group is chemically reacted with the phosphorus-based material in the presence of a catalyst.

9. The process of claim 8, wherein the catalyst includes dimethylaminopyridine (DMAP).

10. The process of claim 1, further comprising forming a polymeric blend that includes the flame-retardant PHA phosphonate material and a second polymeric material.

11. The process of claim 10, wherein the second polymeric material includes a polylactic acid (PLA) material, a polyurethane material, a polycarbonate material, an acrylonitrile butadiene styrene (ABS) material, a polyester material, a polyether material, or a combination thereof.

12. A flame-retardant polyhydroxyalkanoate (PHA) phosphonate material formed by a process comprising:
    forming a polyhydroxyalkanoate (PHA) material having a terminal carboxylic acid group from a biorenewable aliphatic fatty acid via a bacterial fermentation process;
    chemically reacting the PHA material with a diol to convert the terminal carboxylic acid group to a terminal hydroxyl group; and
    chemically reacting the terminal hydroxyl group with a phosphorus-based material to form a flame-retardant PHA phosphonate material, wherein the phosphorus based material includes a phosphine oxide.

13. The flame retardant PHA phosphonate material of claim 12, wherein the phosphorus-based material includes dichlorophenylphosphine oxide.

14. The flame-retardant PHA phosphonate material of claim 12, wherein the diol includes ethylene glycol, propylene glycol, or a combination thereof.

* * * * *